US007310866B2

(12) United States Patent
Balma et al.

(10) Patent No.: US 7,310,866 B2
(45) Date of Patent: Dec. 25, 2007

(54) METHOD FOR MANUFACTURING A PERCUSSION INSTRUMENT

(75) Inventors: Eddy Allan Balma, Ubud Bali (ID); David Frederick McDevitt, Ubud-Bali (ID)

(73) Assignee: Eddy Allan Balma, Ubud-Bali (ID)

( * ) Notice: Subject to any disclaimer, the term of this patent is extended or adjusted under 35 U.S.C. 154(b) by 316 days.

(21) Appl. No.: 11/032,936

(22) Filed: Jan. 11, 2005

(65) Prior Publication Data

US 2006/0150799 A1 Jul. 13, 2006

(51) Int. Cl.
*B23P 11/02* (2006.01)

(52) U.S. Cl. ............................ 29/446; 29/447; 29/448; 29/455.1; 84/411 R

(58) Field of Classification Search ................ 29/91.5, 29/446, 447, 448, 455.1; 84/411 R
See application file for complete search history.

(56) References Cited

U.S. PATENT DOCUMENTS

| | | | | | |
|---|---|---|---|---|---|
| 1,980,876 | A | | 11/1934 | Peters | 292/164 |
| 2,204,987 | A | | 6/1940 | Gussak | 84/412 |
| 3,105,292 | A | * | 10/1963 | Le Jeune | 228/132 |
| 3,185,013 | A | | 5/1965 | Gussak | 84/411 R |
| 3,470,604 | A | * | 10/1969 | Zenick | 29/447 |
| 3,600,479 | A | * | 8/1971 | Yazawa et al. | 264/481 |
| 3,635,633 | A | * | 1/1972 | Yazawa et al. | 425/302.1 |
| D241,974 | S | | 10/1976 | Hustler | D17/22 |
| 4,102,236 | A | | 7/1978 | North | 84/411 R |
| 4,184,407 | A | | 1/1980 | Townshend | 84/411 R |
| 4,549,462 | A | | 10/1985 | Hartry et al. | |
| 5,329,837 | A | | 7/1994 | Appolonia | 84/411 R |
| 5,723,801 | A | | 3/1998 | Hewitt | 84/411 R |
| 2003/0029302 | A1 | | 2/2003 | Reed | 156/379 |
| 2003/0061929 | A1 | | 4/2003 | Dye | 84/411 |
| 2004/0134333 | A1 | | 7/2004 | May | 84/413 |

OTHER PUBLICATIONS

International Search Report based on PCT/US2005/46347, dated Mar. 13, 2007.
Written Opinion of the International Searching Authority based on PCT/US2005/46347, dated Mar. 13, 2007.

* cited by examiner

*Primary Examiner*—Jermie E. Cozart
(74) *Attorney, Agent, or Firm*—Ohlandt, Greeley, Ruggiero & Perle, L.L.P.

(57) ABSTRACT

A method of manufacturing a percussion instrument has the steps of providing a first member into a liquid with the first member having a first diameter. The first member has a first end and a second end. The method also has the step of heating the liquid and stretching the first end of the first member into a second diameter. The method further has the steps of cooling the stretched first end and fitting a skin on the first end.

12 Claims, 10 Drawing Sheets

METHOD FOR MANUFACTURING A PERCUSSION INSTRUMENT

BACKGROUND OF THE INVENTION

1. Field of the Invention

The present invention relates to a method for making a musical instrument. More particularly, the present invention relates to a method for making a percussion instrument from a polyvinyl chloride material.

2. Description of the Related Art

Percussion instruments are known in the art. Methods of making such percussion instruments usually involve multiple and separate steps of manufacture. The steps of the method of manufacture use a number of specific tools and a number of different discrete parts that are assembled together by fasteners or clamps. Percussion instruments usually have a number of parts such as a shell, a chrome fitting, a stand and a skin. Heretofore, a crucial factor in achieving superior tone quality and ensuring durability, is using wood with the shell. The wood shell is preferably created in a round shape and a skin is fitted over the wood shell. A great deal of research and development effort has been put into wood shell manufacturing technology.

Wood shells can be constructed of 6 through 8 wood plies often using different wood materials. These include mahogany, falkata, birch and maple. All are commonly used for shells including single-wood plies, solid wood or man-made materials such as fiberglass, pressed steel, plexiglass, and resin composites. Wood or other composite shells can be finished by laminating the wood shells in plastic. The wood shells may also be made in a large variety of colors and have numerous effects such as a polychromatic shell. The natural wood may be stained or left natural and/or painted with clear lacquer. Steel shells are usually fitted with a chrome, and a plexiglass tint is added.

One or two cast or pressed metal rims are then added to the wood shell. The cast or pressed metal rims are connected by a threaded tension rod or a lug to a nut box that is bolted onto the wood shell. This tension rod assembly needs to be precision machined, casted and fitted and sometimes manually added to enable predictable and secure tuning without inhibiting resonance or introducing extra vibration.

Mounting systems can vary greatly, from a simple cast block on the shell that accepts and clamps to a rod attached to a clamp or holder, to more sophisticated arrangements using a clamp. The clamp system allows attachment of the drum without the need of a hole in the wood drum shell. The clamp is attached to the wood shell at a nodal point with two bolts to allow the wood shell to vibrate freely without degrading the shell's dynamic range. The nodal point is the location on a shell with the least amount of vibration thereby allowing for a mount to have minimal affect on the resonance of the wood shell.

Although very fine percussion instruments are made in this manner, these methods of manufacturing the percussion instruments are costly, and involve a great deal of labor. This labor, and the number of costly fine wood materials to form the wood shell, increase costs. They also further increase an overall time to manufacture the percussion instruments. Additionally, synthetic shells of various forms have been used for some time now. All of the previous methods use resin based materials including fiberglass with a molding process. Such a molding process needs permanent molds. The method of the present invention eliminates the need for such costly molds.

Accordingly, there is a need for a method for manufacturing a percussion instrument that eliminates one or more of the aforementioned drawbacks and deficiencies of the prior art.

SUMMARY OF THE INVENTION

It is an object of the present invention to provide a percussion instrument that can be manufactured from a polyvinyl chloride material.

It is an object of the present invention to provide a percussion instrument that can be manufactured from a standard polyvinyl chloride material pipe that is readily available and does not have to be manufactured for the percussion instrument.

It is another object of the present invention to provide a percussion instrument that can be manufactured from a polyvinyl chloride in a cost effective and fast manner.

It is still another object of the present invention to provide a method of making a percussion instrument that is efficient and does not sacrifice an acoustic quality of the percussion instrument.

It is yet another object of the present invention to provide a percussion instrument that is made from a stretched polyvinyl chloride.

It is a further object of the present invention to provide an apparatus that can fit inside a hollow piece of polyvinyl chloride, such as a pipe, heat the polyvinyl chloride pipe, and stretch the polyvinyl chloride pipe without the polyvinyl chloride pipe cracking to form a drum shell.

It is a still further object of the present invention to provide an apparatus that can fit inside a polyvinyl chloride pipe that has a number of resilient arms that stretch the polyvinyl chloride pipe without the polyvinyl chloride pipe cracking to form a drum shell It is a yet further object of the present invention to provide a drum shell that is made from a polyvinyl chloride material shell that has an acoustic property similar to that of a wood drum shell.

It is a yet still further object of the present invention to provide a method of making a polyvinyl chloride drum shell from an inexpensive starting material in manner more efficient including less time consuming, than that of wood drum shells.

It is a still further object of the present invention to provide a method for making a percussion instrument from a polyvinyl chloride pipe having a longitudinal axis where a polyvinyl chloride drum shell is formed from the polyvinyl chloride pipe being stretched in a direction from an inner surface of the polyvinyl chloride pipe outwards from the longitudinal axis.

These and other objects and advantages of the present invention are achieved by a method of manufacturing a percussion instrument according to the present invention. The method has the steps of providing a first member into a liquid with the first member having a first diameter and the first member having a first end and a second end. The method also has the steps of heating the liquid and stretching the first end of the first member into a second diameter. The method also has the steps of cooling the stretched first end and fitting a skin on the first end.

DETAILED DESCRIPTION OF THE INVENTION

Figure 1:
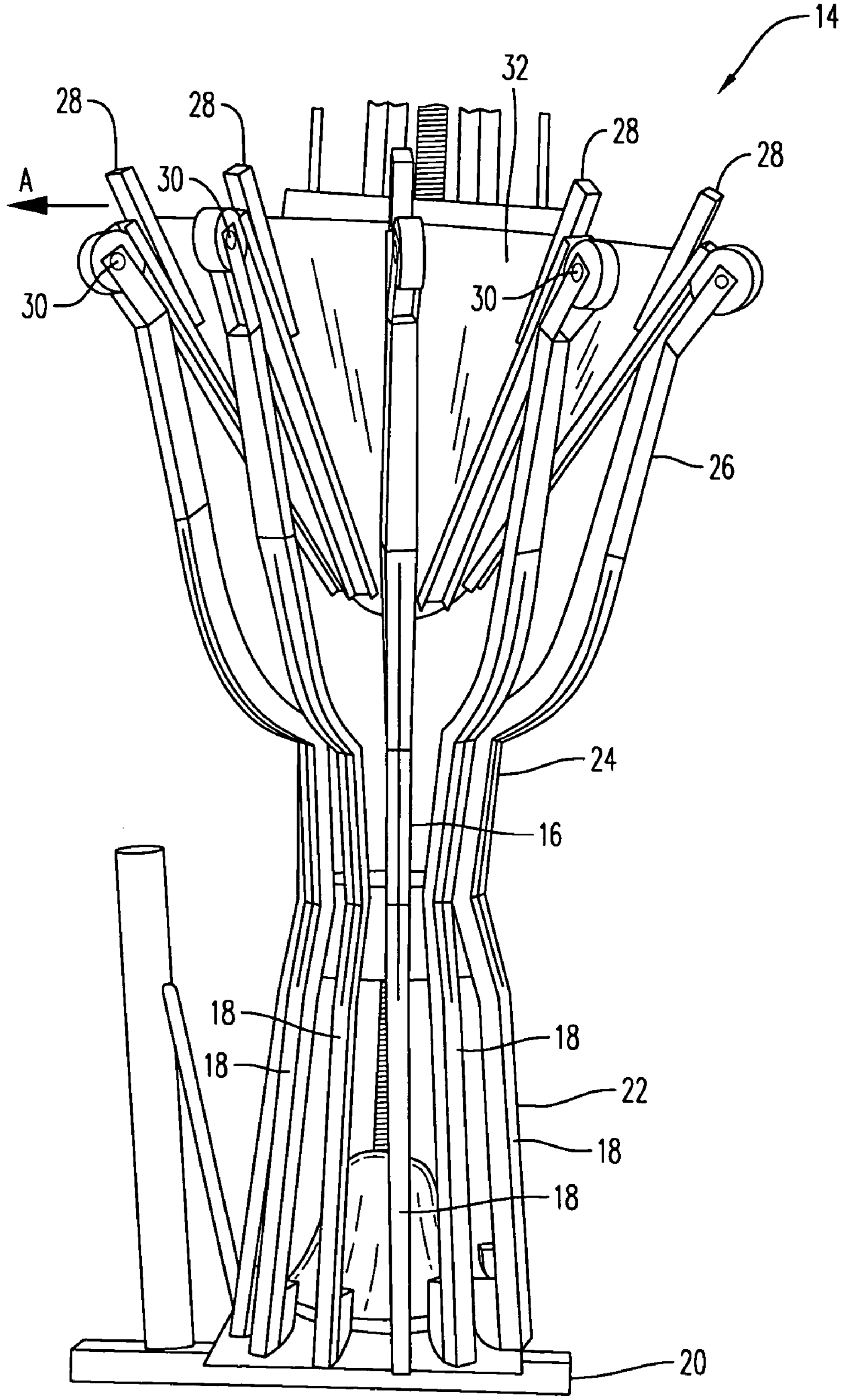
FIG. 1 is a front perspective view of an apparatus for stretching a polyvinyl chloride pipe of the present invention with the apparatus mating with a press.
Figure 2:
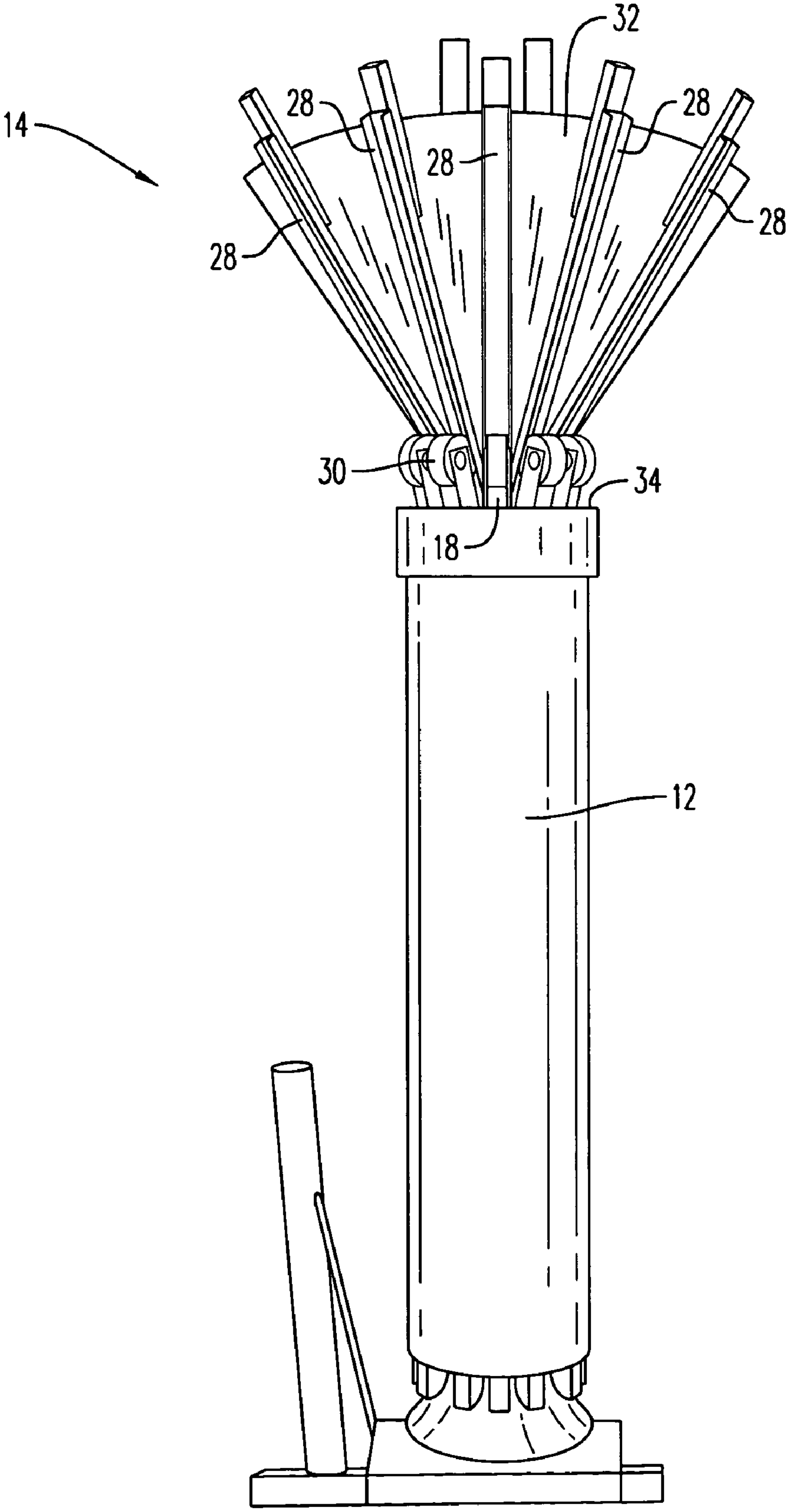
FIG. 2 is a front perspective view of the apparatus of FIG. 1 being placed in the polyvinyl chloride pipe with a number of resilient arms extending outward of the polyvinyl chloride pipe.

Referring to the drawings and, in particular, to FIG. 1, there is shown a method of making a percussion instrument of the present invention. The percussion instrument of the present invention is generally represented by reference numeral 10. The percussion instrument 10 is intended to be made from a commercially readily available polyvinyl chloride material that is formed in a hollow sleeve or pipe 12 with a shaped cross section as shown in FIG. 2. One skilled in the art should appreciate that any thermoplastic or any polymer material may be used and is within the scope of the present invention. Preferably, the polyvinyl chloride pipe 12 has one or more layers of polyvinyl chloride at one or more location of the pipe for added thickness at preselected locations. Preferably, the polyvinyl chloride pipe 12 has a grade “D” middle thickness. Alternatively, the polyvinyl chloride pipe 12 has an “AW” grade. Also, preferably, the polyvinyl chloride pipe 12 is a white or gray colored pipe with a four inch diameter, a two millimeter wall thickness and is forty six centimeters long. Additionally, a second layer of polyvinyl chloride pipe is placed over the polyvinyl chloride pipe 12 for reinforcement thereof with the second layer having complementary dimensions and a four centimeter long length. Alternatively, the polyvinyl chloride pipe 12 may have a white color and have a four inch diameter with a two millimeter wall thickness and be about fifty six centimeters long with the second layer being about four centimeters long. Still further, in another embodiment, the polyvinyl chloride pipe 12 may have a five inch diameter with a 2.6 millimeter wall thickness and be sixty-six centimeters long with the second layer being about four centimeters long. One skilled in the art should appreciate the polyvinyl chloride pipe 12 may have other sizes and another thickness and the present invention is not strictly limited to the above embodiments.

The method of the present invention is advantageous, uses a commercially and readily available material favorable to wood and other materials used in shell construction, obviates a number of costly manufacturing procedures, and has the unexpected advantage of producing a percussion instrument that has substantially the same quality as other percussion instruments made from time consuming and expensive manufacturing methods.

This method of the present invention reduces an amount of time to manufacture the percussion instrument such as a bongo drum, a snare, a drum, a drum shell, or any other acoustic instrument known in the art. The method of the present invention is advantageous because the acoustic quality of the percussion instrument is not sacrificed and, in fact, is comparable to using favorable wood shells. This simultaneous acoustic quality and reduced cost has an unexpected advantage over the prior art. The prior art drum shells teach away from this invention since they encourage the use of high quality wood shells made from expensive materials to ensure acoustic quality such as for example drum shells.

Most preferably, the percussion instrument 10 is a drum shell. However, the present invention made be used with any acoustic instrument known in the art. Also, the method does not necessarily have to be used for manufacturing such acoustic devices. It may be used to manufacture other vessels, cups, pots, planters, bowls, or other articles known in the art for holding a liquid or solid.

Referring to FIG. 1, there is shown an apparatus 14 for manufacturing the percussion instrument 10 from the polyvinyl chloride pipe 12. The apparatus 14 is preferably made from one or more resilient materials such as a steel, a metal, an aluminum, a resilient polymer that can withstand a high temperature, a composite material or any other resilient material that is capable of withstanding high temperatures while maintaining structural integrity so the apparatus 14 will not melt or be deformed upon being heated.

The apparatus 14 most preferably has a predetermined size so that a portion of the apparatus can be compressed to fit into and through the polyvinyl chloride pipe 12 and another second portion of the apparatus may extend out of the polyvinyl chloride pipe. The size of the apparatus 12 is dependent on a diameter of the polyvinyl chloride pipe 12 used. The apparatus 14 preferably has a body 16 with a number of resilient bars 18 that are arranged in a cylindrical pattern as shown. In one embodiment of the present invention, the apparatus 14 has first through twelve resilient bars that are each connected to a stand 20. The stand 20 is connected to the number of resilient bars 18 and acts as a base for supporting one or more portions of the apparatus. The twelve resilient bars 18 preferably form the body 16 with wide portion 22 and a narrow portion 24 and a second wide portion 26. As shown, the body 16 forms a hourglass shaped structure. Connected on the resilient bars 18 at the wide portion 22 of the apparatus 14 are a number of resilient arms 28. The resilient arms 28 are made from the same or a different material relative to the resilient bars 18 of the body 16 and may be a metal, aluminum, steel, composite or other resilient material that is capable of withstanding high temperatures.

Each resilient arm 28 is connected to each resilient bar 18 by a connection point 30. Preferably, the apparatus has two sets of resilient arms 28 that are pressed outward from the apparatus 12. The connection point 30 is suitable so the resilient arms 28 may move freely in an inward direction toward an inner surface of the resilient bars 18 and opposite a longitudinal axis of the body 16 as indicated by reference arrow A. In one embodiment, the connection point 30 is a roller bearing. However, the connection point 30 may be any another structure known in the art such as a pivot, a clamp, a hinge or any other suitable structure to permit the resilient arms 28 to move in the direction of reference arrow A.

The apparatus 14 has a press 32. The press 32 is preferably a resilient member that contacts the resilient arms 28. The press 32 imparts on each resilient arm 28 a force and forces each of the resilient arms in a first direction perpendicular to the longitudinal axis of the body 16. The press 32 preferably is a triangular shaped resilient member and has a triangular cross section. The press 32 is preferably connected to, and is powered by, a hydraulic power source to move down in a direction parallel to the longitudinal axis of the body 16. Alternatively, the press 32 may push the resilient arms 28 that in turn push a dome shaped member. The dome shaped member preferably is inside the apparatus 14 between the resilient arms 28. The dome shaped member preferably rises and pushes the resilient arms 28 outward with both the dome shaped member and the resilient arms being connected to a threaded rod. Preferably, the hydraulic source is a five or ten ton hydraulic jack, a car jack, or any other hydraulic source in the art. The hydraulic source may be run using air, oil or hand jacking as is well known in the art. Once powered, the press 32 moves the resilient arms 28, the resilient bars 18, or both the resilient arms and the resilient bars in a direction that is perpendicular to the longitudinal axis of the body 16.

FIG. 2 shows the polyvinyl chloride or polymer based pipe 12 placed around the apparatus 14. The polyvinyl chloride pipe 12 surrounds the wide portion 22 of the body 16, the narrow portion 24 and the second wide portion 26 with a portion of the apparatus 14 extending out of the polyvinyl chloride pipe. As shown, the resilient bars 18 fit into the polyvinyl chloride pipe 12, while the resilient arms 28 extend out of an opening 34 of the polyvinyl chloride pipe. The press 32 rests in an initial position with the resilient arms 28 surrounding the press as shown. One skilled in the art will appreciate that FIG. 2 shows an initial commencement position of the apparatus 14 for practicing the method.

Figure 3:
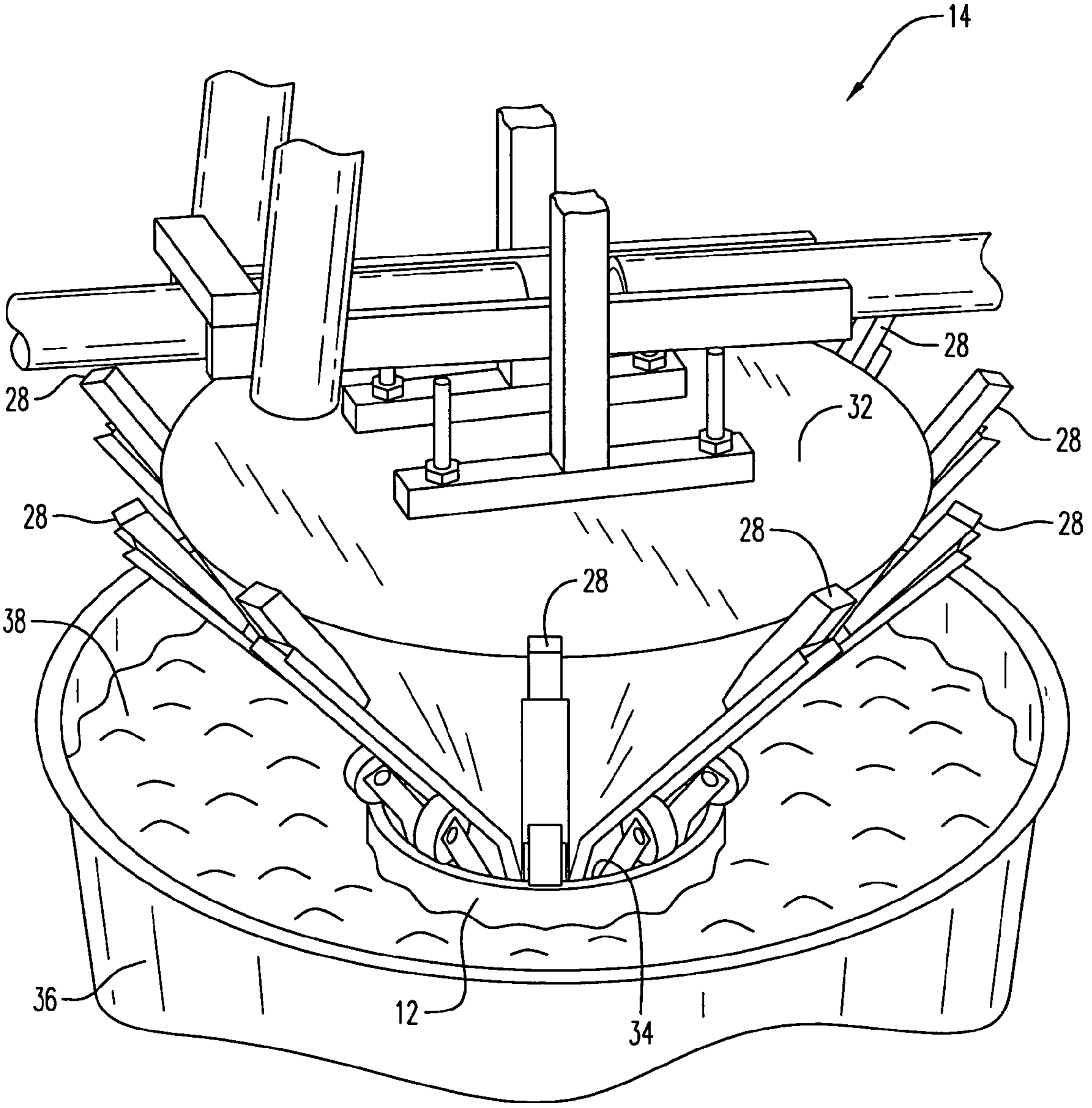
FIG. 3 is a top perspective view of the apparatus of FIG. 1 with the polyvinyl chloride pipe and the apparatus being submerged in a boiling liquid in a vessel and the press exerting a force thereon.

Referring now to FIG. 3, the apparatus 14 further has a vessel 36 that is a large pot or tub made from a resilient material that may withstand temperatures in excess of several hundred degrees Celsius. The vessel 36 is preferably made from galvanized steel, metal, aluminum or another resilient material, and can be filled with a liquid 38 as shown. The apparatus 14 has a heater thermally connected to the vessel 36 to heat the liquid 38 therein. The vessel 36 has suitable dimensions so that the polyvinyl chloride pipe 12 is almost completely submerged therein. The liquid 38 in this preferred embodiment is water. However, one skilled in the art should appreciate that the liquid may be any suitable liquid known in the art such as water having solvents, or catalytic agents therein.

As is shown, the apparatus 14 with the polyvinyl chloride pipe 12 is placed in the vessel 36. The liquid 38 is brought to a near boiling point and the polyvinyl chloride pipe 12 is brought to a transition state. In the transition state, the polyvinyl chloride pipe 12 changes a state of the material from a solid to a malleable state. Preferably, the polyvinyl chloride pipe 12 is in the boiling water for about one minute before becoming the malleable state and expanding. Also, preferably the polyvinyl chloride pipe 12 has one or more extra layers of a five centimeter polyvinyl chloride pipe material at or adjacent to the opening 34 overlapping the polyvinyl chloride pipe 12. The press 32 in the initial position is then contacted and driven by the hydraulic device (not shown). The hydraulic device imparts a force to the press 32. The press 32 then imparts the force on the number of resilient arms 28 that then contact and push the polyvinyl chloride pipe 12 in a lateral perpendicular direction relative to the longitudinal axis of the body 16. The polyvinyl chloride pipe 12 then is stretched from a first initial diameter to a second diameter that is larger than the first diameter. The polyvinyl chloride pipe 12 is preferably stretched in a direction from an inside of the polyvinyl chloride pipe to an outside of the polyvinyl chloride pipe by the resilient bars 18, the resilient arms 28 or both.

Figure 4:
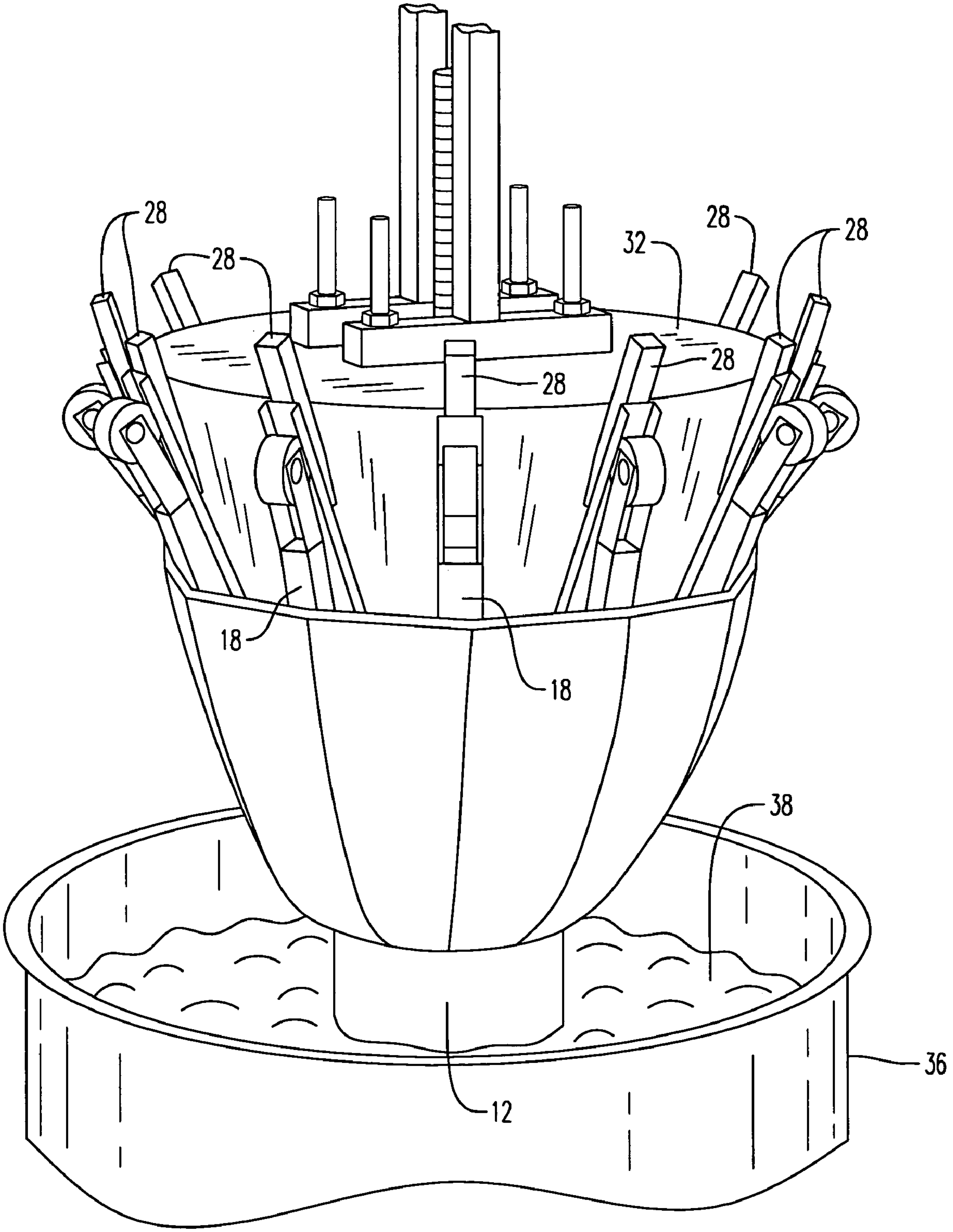
FIG. 4 is a front view of the apparatus of FIG. 3 being removed from the boiling liquid in the vessel with the polyvinyl chloride pipe being stretched thereby.

FIG. 4 shows the apparatus 14 in an elevated position relative to the vessel 36 with the press 32 being in a second position or partially in the polyvinyl chloride pipe 12. As shown in FIG. 4, the polyvinyl chloride pipe 12 now has the second larger diameter that is desired by the operator of the apparatus 14, or that is automatically set by for example an automation system or software program. The method further has the step of repeating the steps for the opposite side of the polyvinyl chloride pipe 12 as mentioned above for a second stretched side 40 and thus forming the drum shell 10.

Figure 5:
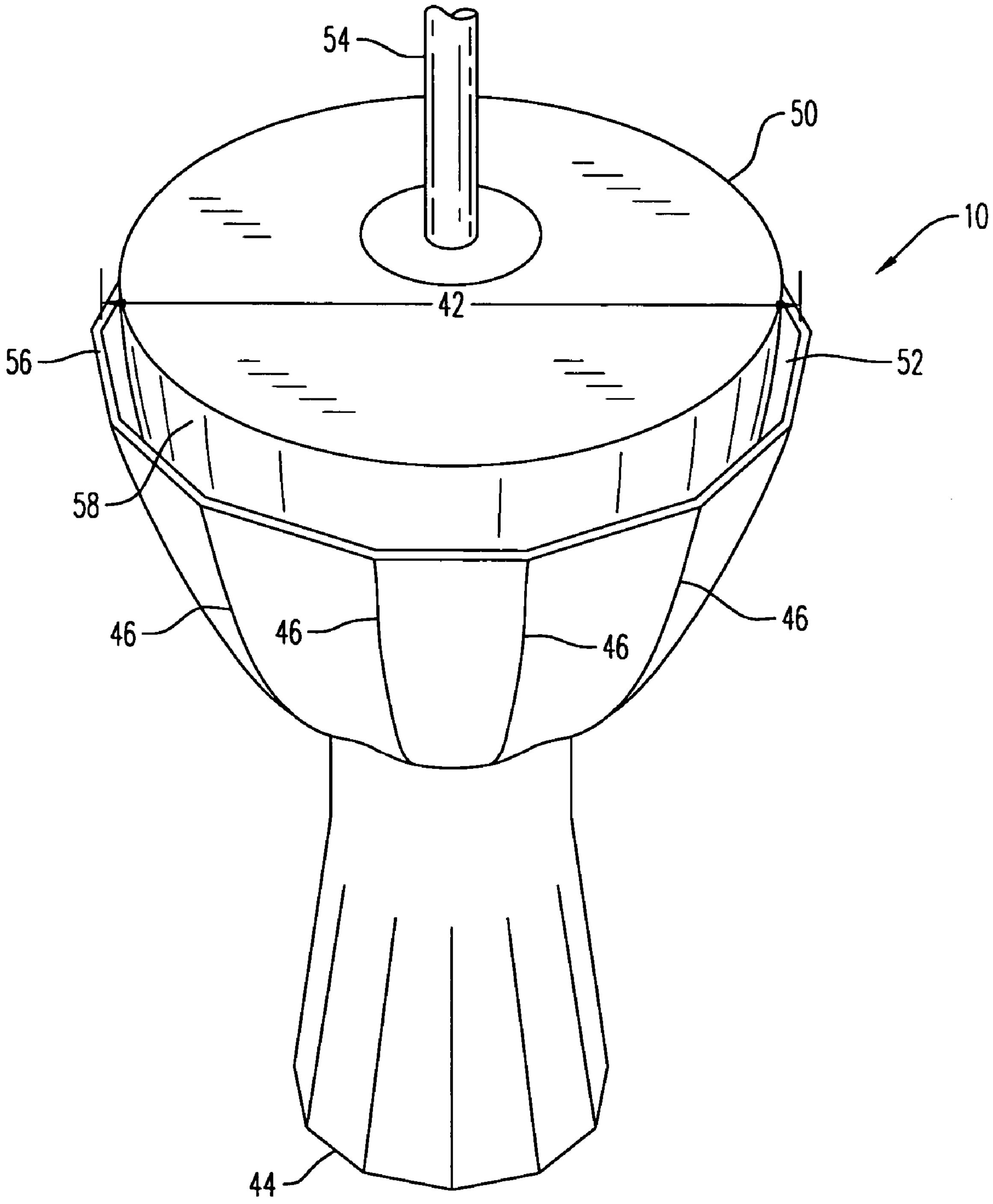
FIG. 5 is a top perspective view of a mold being placed in a first end of the stretched polyvinyl chloride pipe for reintroduction to the boiling liquid.

FIG. 5 shows the drum shell 10 made from the polyvinyl chloride pipe 12. The drum shell 10 has a first enlarged diameter 42 and a second enlarged diameter 44 opposite of the first diameter. When the drum shell 10 is cooled, the drum shell has a number of striations 46 formed in an outer surface 48 thereof. The number of striations 46 may adversely effect one or more acoustic properties of the drum shell 10. According, the method also has the step of inserting a circular shaped mold 50 in the first stretched end 52 of the drum shell 10. The mold 50 preferably is in two parts with one bottom portion that has a rod that is connected to a top portion and made from a resilient material that is capable of withstanding a high temperature. The mold 50 has a manipulating arm 54 disposed through a centermost portion of the mold, as shown, for manipulating the mold. The mold 50 is inserted into the first stretched end 52 of the polyvinyl chloride drum shell so an outer edge 56 of the drum shell 10 contacts an outer periphery 58 of the mold 50.

Figure 6:
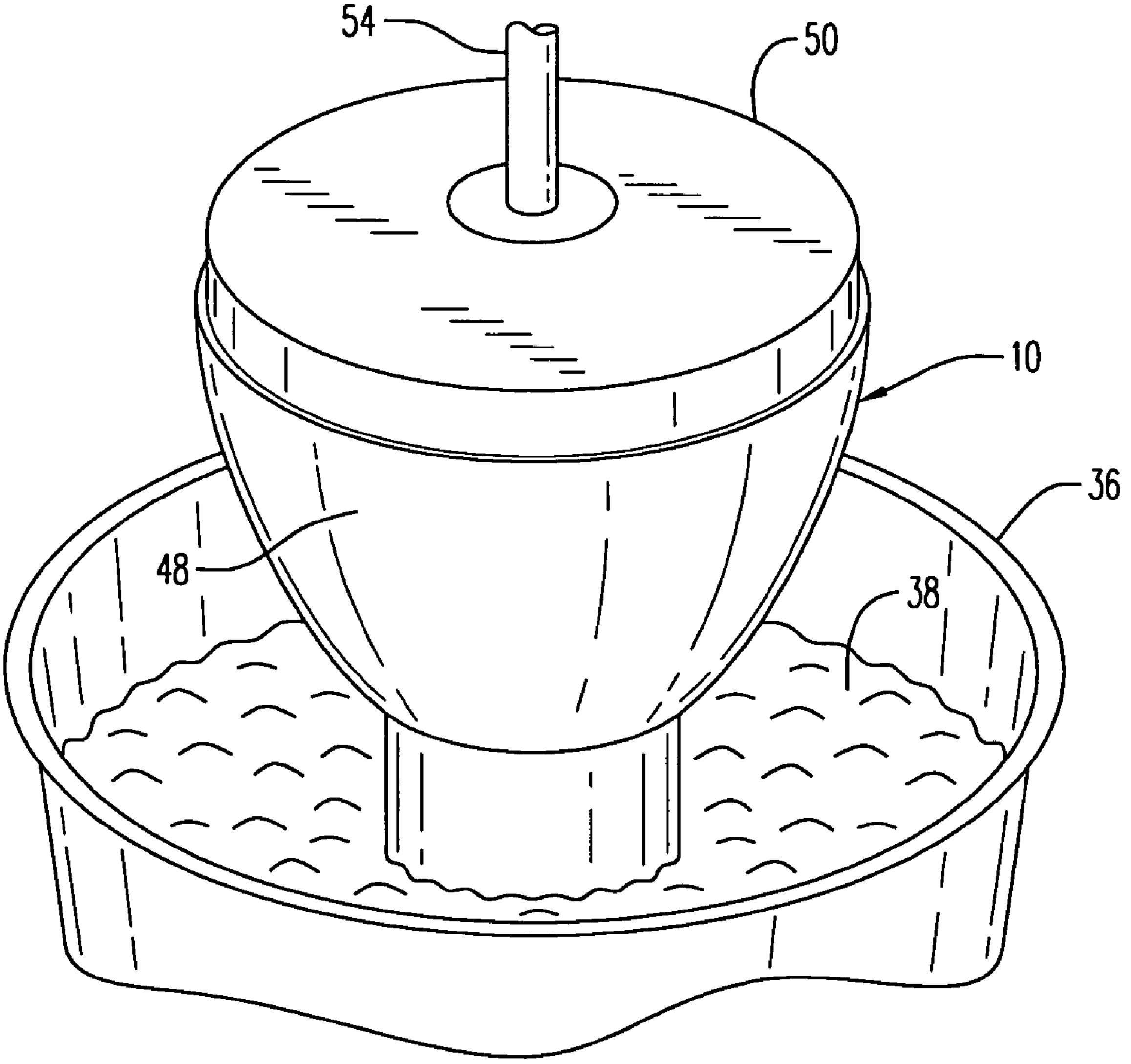
FIG. 6 is a perspective view of the stretched polyvinyl chloride pipe removed from the boiling liquid in the vessel, and with the polyvinyl chloride pipe smoothed into a spherical shape.

Referring now to FIG. 6, the mold 50 with the drum shell 10 are both placed in the vessel 36 with the boiling liquid 38 for heating the drum shell. The reheating of the drum shell 10 transitions from the solid state to the malleable state and is formed with a complementary shape of the mold 50 as shown. The reheating is performed for one to two minutes. The outer surface 48 of the drum shell 10 then does not have any striations 46 on the outer surface thereof and has a consumer pleasing smooth shape.

Figure 7:
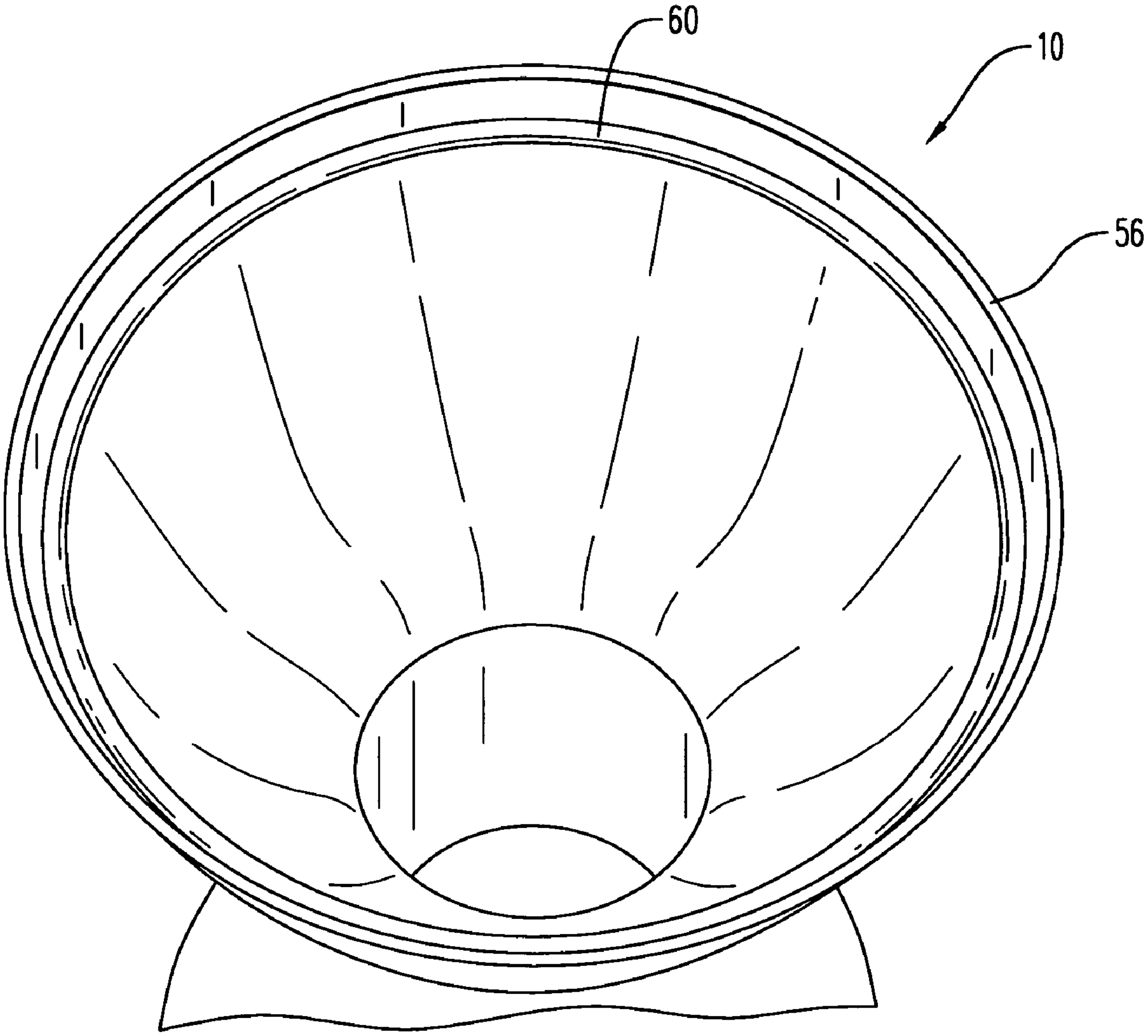
FIG. 7 is a top view of the polyvinyl chloride drum shell with a first circular resilient member inserted therein.

Referring to FIG. 7, the drum shell 10 further has a bearing member 60 that is placed adjacent the outer most edge 56 of the drum shell 10. The bearing member 60 is preferably a resilient steel or metal member, but less preferably is any circular shaped resilient member known in the art. The bearing member 60 is preferably spaced a predetermined distance apart from the outer most edge 56 of the drum shell 10. The bearing member 60 is preferably intended to reinforce the drum shell 10. The outermost edge 56 is preferably reheated in order to soften the outermost edge of the drum shell. Thereafter, the user pinches the outermost edge 56 of the drum shell 10 over to connect the bearing member 60 in a lateral side around the outermost edge as shown. One skilled in the art will appreciate that the drum shell 10 has memory, and the drum shell will attempt to shrink back to an original shape when reheated. Accordingly, an unexpected advantage is that once the drum shell 10 is reheated in the liquid 38, the drum shell 10 and any extra layers thereof will automatically curve around the bearing member 60 to form a bearing edge.

Figure 8:
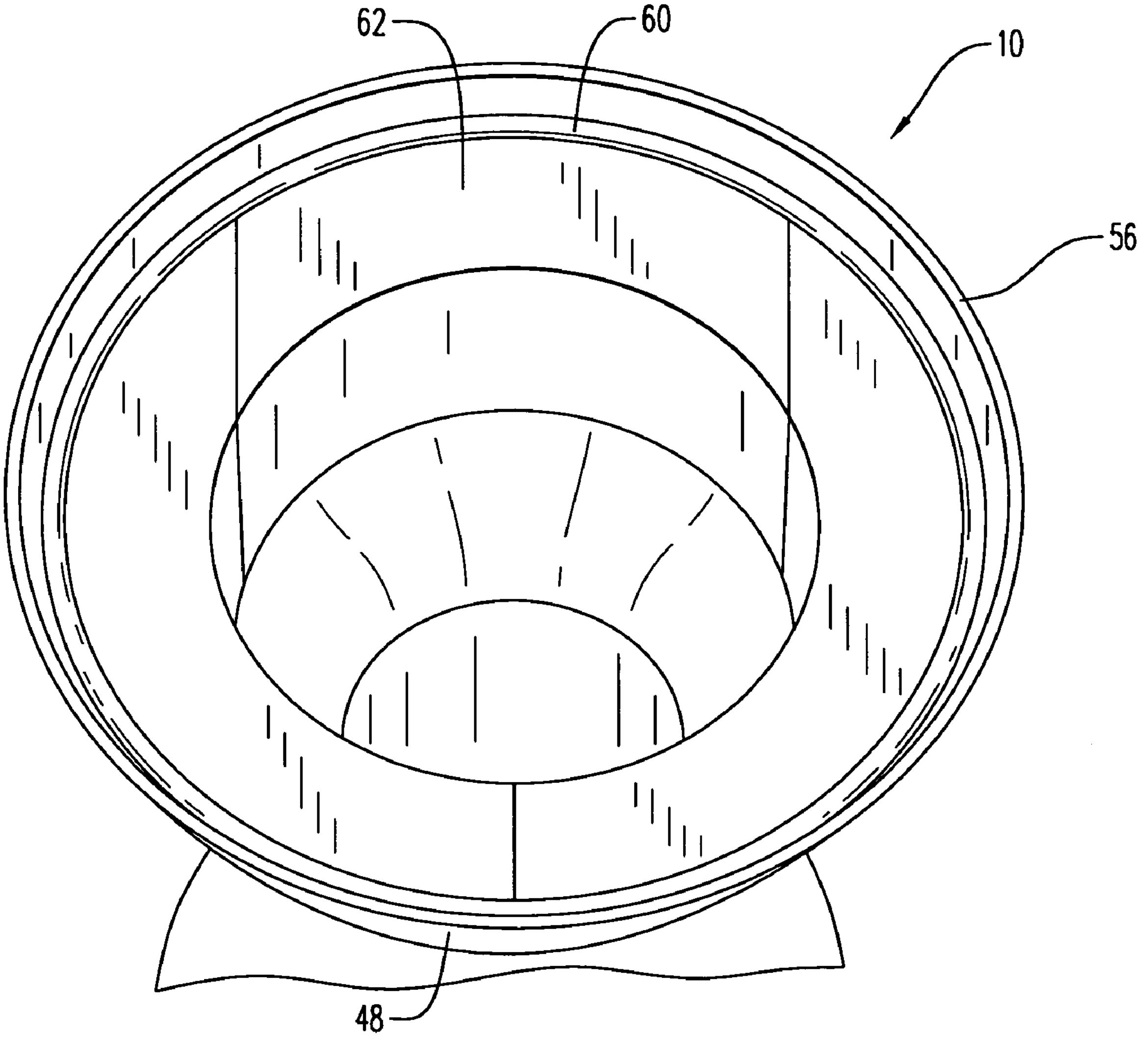
FIG. 8 is a top view of a wooden mold placed in a opening of the polyvinyl chloride drum shell for creating a desired curve upon reheating thereof.
Figure 9:
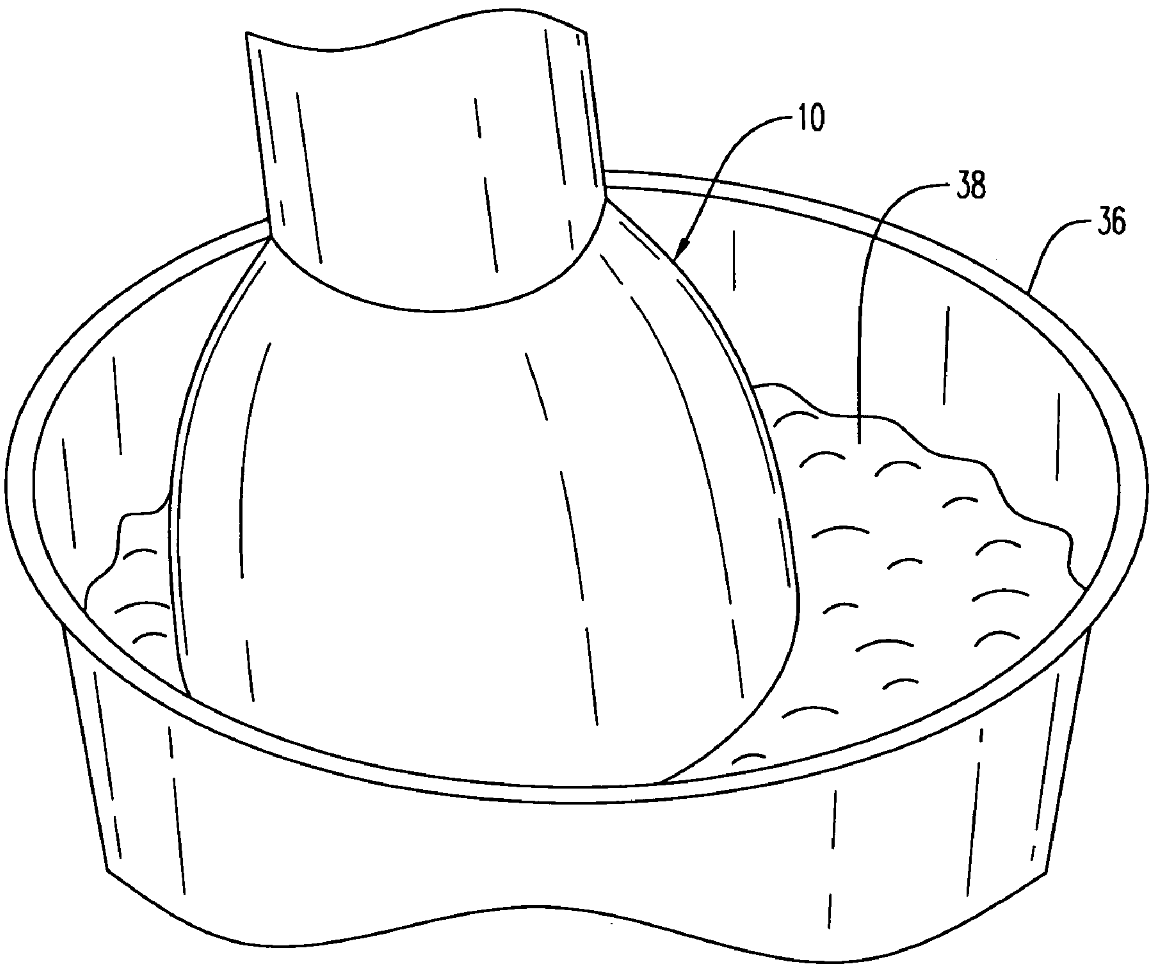
FIG. 9 is a perspective view of the stretched polyvinyl chloride pipe reheated in the boiling liquid in the vessel for creating the desired curve.
Figure 10:
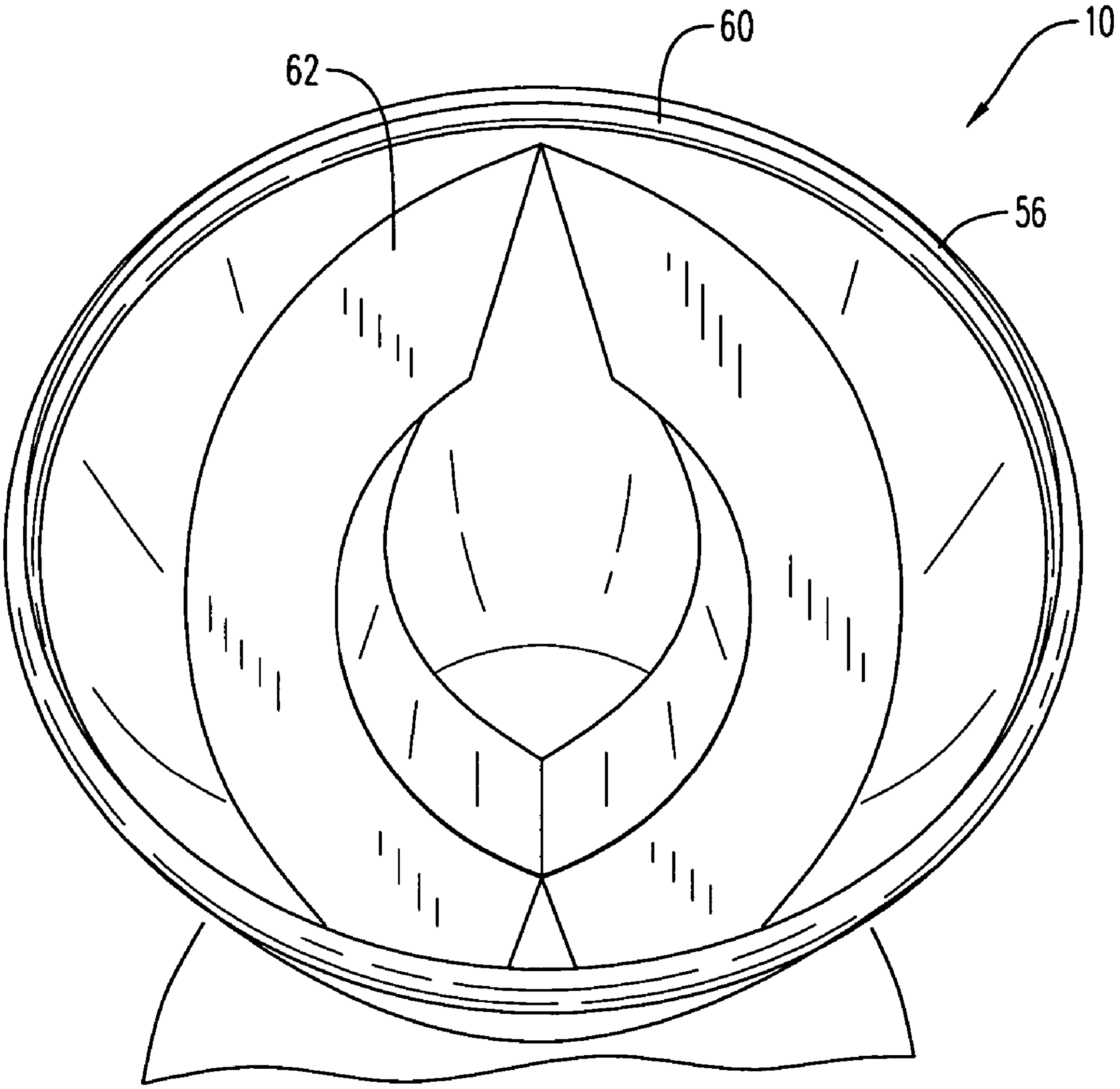
FIG. 10 is a top view of the percussion instrument having a bearing head and the desired curve for fitting with a drum skin thereon.

Referring to FIG. 8, the drum shell 10 has an "O" shape wood member 62 therein disposed underneath the bearing member 60 for curving again the outermost edge 56 and the outer surface 48 of the drum shell 10 and for imparting one or more acoustic properties to the drum shell. As shown in FIGS. 8, through 10, the drum shell 10 is reheated and placed in the boiling liquid 38 in the vessel 36 for shaping the drum shell 10 around the wood member 62 as shown in FIG. 10. Alternatively, the drum shell 10 is removed from the liquid 38 and the drum shell 10 is pressed on a flat surface while the plastic is still hot. Once pressed flat, a wood mold 62 is collapsed and taken out, and as shown, the bearing member 60 automatically stays inside the drum shell 10. The drum shell 10 still has some inconsistencies in the top. Thus, an optional sanding may be performed to even out the drum shell 10 and make sure all the sharp edges are smooth. This is favorable for the acoustical properties of the drum shell and the predetermined sound emitted therefrom. As shown, the drum shell 10 is curved to a desired shape by heating the drum shell around the wood member 62 in order to produce high and clean slap when a drum skin (not shown) is connected at the outermost end of the drum shell.

It should be understood that the foregoing description is only illustrative of the present invention. Various alternatives and modifications can be devised by those skilled in the art without departing from the invention. Accordingly, the present invention is intended to embrace all such alternatives, modifications and variances. The preferred embodiments described with reference to the attached drawing figures are presented only to demonstrate certain examples of the invention. Other elements, steps, methods and techniques that are insubstantially different from those described above and/or in the appended claims are also intended to be within the scope of the invention.

What is claimed is:

1. A method of manufacturing a percussion instrument, comprising:

providing a first member into a liquid, said first member having a first diameter, said first member having a first end and a second end;

heating said liquid;

stretching said first end of said first member into a second diameter;

cooling said stretched first end; and fitting a skin on said first end.

2. The method of claim 1, wherein said first member is a pipe.

3. The method of claim 2, wherein said pipe is made from polyvinyl chloride.

4. The method of claim 1, wherein said first member has more than one layer of material at said first end.

5. The method of claim 1, wherein said first member has a plurality of layers.

6. The method of claim 5, wherein each of said plurality of layers is made of a polyvinyl chloride.

7. The method of claim 1, further comprising the step of shaping said heated stretched first end into a shape.

8. The method of claim 7, wherein said shape is selected from the group consisting of a circular shape, an elliptical shape, an oblong shape, and any combinations thereof.

9. A method of manufacturing a percussion instrument, comprising:

providing a first member into a liquid, said first member having a first diameter, said first member having a first end and a second end;

heating said liquid;

stretching said first end of said first member into a second diameter;

cooling said stretched first end;

shaping said heated stretched first end into a shape;

adding structural support at said stretched first end; and fitting a skin on said first end.

10. The method of claim 9, wherein the step of adding structural support at said stretched first end is provided by adding a resilient ring in or on said stretched first end, and wherein said first member at said stretched first end is wrapped around said resilient ring.

11. The method of claim 1, further comprising the step of forming a bearing edge around a circumference of the stretched first end of said first member.

12. A method of manufacturing a percussion instrument, comprising:

providing a first pipe member into a boiling liquid, said first pipe member having a first diameter, a first end and a second end opposite said first end, said first end being made from a plurality of layers;

stretching said first end of said first pipe member into a second diameter in said boiling liquid;

stretching said second end of said first pipe member into a third diameter in said boiling liquid;

removing said first pipe member from said boiling liquid;

reinforcing said first pipe member;

cooling said stretched first end; and fitting a skin on said first end, wherein said first pipe member is a polyvinyl chloride member.

* * * * *